United States Patent [19]
Wung et al.

[11] Patent Number: 6,137,260
[45] Date of Patent: Oct. 24, 2000

[54] MULTIFUNCTION CONNECTOR FOR HAND-HELD TERMINAL DOCKS

[75] Inventors: Peter Wung; Raymond P. Guichard, both of Redmond, Wash.

[73] Assignee: Intermec IP Corp., Beverly Hills, Calif.

[21] Appl. No.: 09/239,573

[22] Filed: Jan. 29, 1998

[51] Int. Cl.[7] .................................................. H01M 10/46
[52] U.S. Cl. ........................................... 320/116; 320/119
[58] Field of Search .................................... 320/107, 110, 320/112, 113, 116, 119

[56] References Cited

U.S. PATENT DOCUMENTS

| | | | |
|---|---|---|---|
| 3,696,283 | 10/1972 | Ackley, III | 320/110 |
| 4,672,292 | 6/1987 | Hernandez | 320/113 X |
| 4,716,352 | 12/1987 | Hurn et al. | 320/113 X |
| 4,739,242 | 4/1988 | McCarty et al. | 320/113 X |
| 5,117,172 | 5/1992 | Chen | 320/116 |
| 5,900,715 | 5/1999 | Roberts | 320/119 X |

Primary Examiner—Edward H. Tso
Attorney, Agent, or Firm—Perkins Coie LLP

[57] ABSTRACT

An assembly of terminal docks connectable to a power or data source and interconnected by a jumper connector adapted to transfer power, data, or both between adjacent terminal docks. The terminal docks are configured to carry power or data to or from a hand-held electronic device. A first terminal dock is connectable to a power source and has a first receptacle with a connector therein electrically connectable to the power source. A second terminal dock has a second receptacle and a second connector therein. A connector chip mechanically retains the first and second terminal docks immediately adjacent to each other. The connector chip also has first and second engagement members and an electromagnetic pathway extending therebetween. The first engagement member is positionable in the first receptacle of the first terminal dock so the electromagnetic pathway is connected to the first connector, and the second engagement member is positionable in the second receptacle of the second terminal dock, so the electromagnetic pathway is connected to the second connector to transfer power or data between the first and second terminal docks.

12 Claims, 10 Drawing Sheets

MULTIFUNCTION CONNECTOR FOR HAND-HELD TERMINAL DOCKS

TECHNICAL FIELD

The present invention is directed toward power accessories for use with hand-held electronic devices, and more particularly, toward components for docking assemblies configured to removably receive the electronic devices.

BACKGROUND OF THE INVENTION

Conventional hand-held electronic devices used to collect and send selected data, such as by scanning symbology or the like, are typically powered by rechargeable batteries. Power accessories, such as terminal docking stations or terminal docks, are often used to recharge the batteries when the device is not in use. A conventional terminal dock has a power cord connected to a power source, and the terminal dock removably receives a hand-held electronic device so as to provide power to recharge the batteries. A conventional terminal dock is also adapted for data transfer between the hand-held device and a computer system via a separate data transmission line.

When several terminal docks are used in a common location, they are typically mounted or ganged together in a side-by-side configuration. One ganging arrangement includes an elongated retention bracket to which all of the terminal docks are mechanically fastened, so the terminal docks are secured together by the same bracket. When several terminal docks are ganged together, all of the power cords and data transmission lines typically extend behind or below the terminal docks. These power cords and data transmission lines are easily tangled amongst themselves and can be difficult to manage, particularly when a terminal dock needs to be removed from the bracket and replaced.

Conventional "ganging" brackets include a long piece of metal extrusion sized to gang five individual terminal docks together. The power cords from each terminal dock are typically bundled together and separately plugged into a power source, so the terminal docks are not serially connected to the power source. Removing or replacing a terminal dock from this ganged configuration is burdensome because the terminal dock must be unfastened from the bracket, and the power cord and data transmission line must be untangled and extricated from the bundle of other power cords and data transmission lines. In addition, a space or gap in the ganging bracket results in an exposed portion of the bracket and cords when a terminal dock is removed from the bracket, which is undesirable.

The conventional ganging configuration also uses a single power module to which each of the power cords attach. Providing power from a single power module is inflexible and expensive, because the power module must be designed to power up multiple units, even though only one or two units are used. Therefore, there is a need for an improved, cost-efficient ganging configuration for any number of terminal docks while providing a high degree of flexibility and versatility.

SUMMARY OF THE INVENTION

The present invention solves the above problems and provides additional benefits not recognized by the prior art. One aspect of the invention embodies an assembly of terminal docks connectable to a single electromagnetic signal source. The assembly includes a first terminal dock having a first connector electromagnetically coupleable to the electromagnetic signal source. A second terminal dock is positioned substantially adjacent to the first terminal dock and has a second connector. A connection member releasably engages and retains the first and second terminal docks adjacent to each other. The connection member has first and second engagement members with the first engagement member being in electromagnetic engagement with the first connector of the first terminal dock. The connection member's second engagement member is in electromagnetic engagement with the second connector of the second terminal dock. The connection member mechanically gangs the first and second terminal docks together and is also configured to carry electromagnetic signals through the connector between the first and second terminal docks. Thus, a single connection member provides for the mechanical and electromagnetic connection between the terminal docks.

In one aspect, the electromagnetic signal source is a power or electricity source, and the connection member mechanically and electrically connects the first and second terminal docks together. In another embodiment of the invention, the first and second terminal docks have data transmission lines that communicate with the hand-held devices for data transmission to and from the devices. The connection member includes a data transmission line therethrough that engages and interconnects the data transmission lines of the first and second terminal docks. The connection member, thus, also allows data to pass between the first and second terminal docks.

In one aspect of the invention, the connector has at least one cable management receptacle formed therein. The receptacle is shaped and sized to removably receive and retain power cord data transmission lines, or other lines or cords adjacent to the ganged terminal docks.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with the terminal docks and hand-held electronic devices have not been shown in detail to avoid unnecessarily obscuring the description of the embodiments of the invention.

Figure 1:
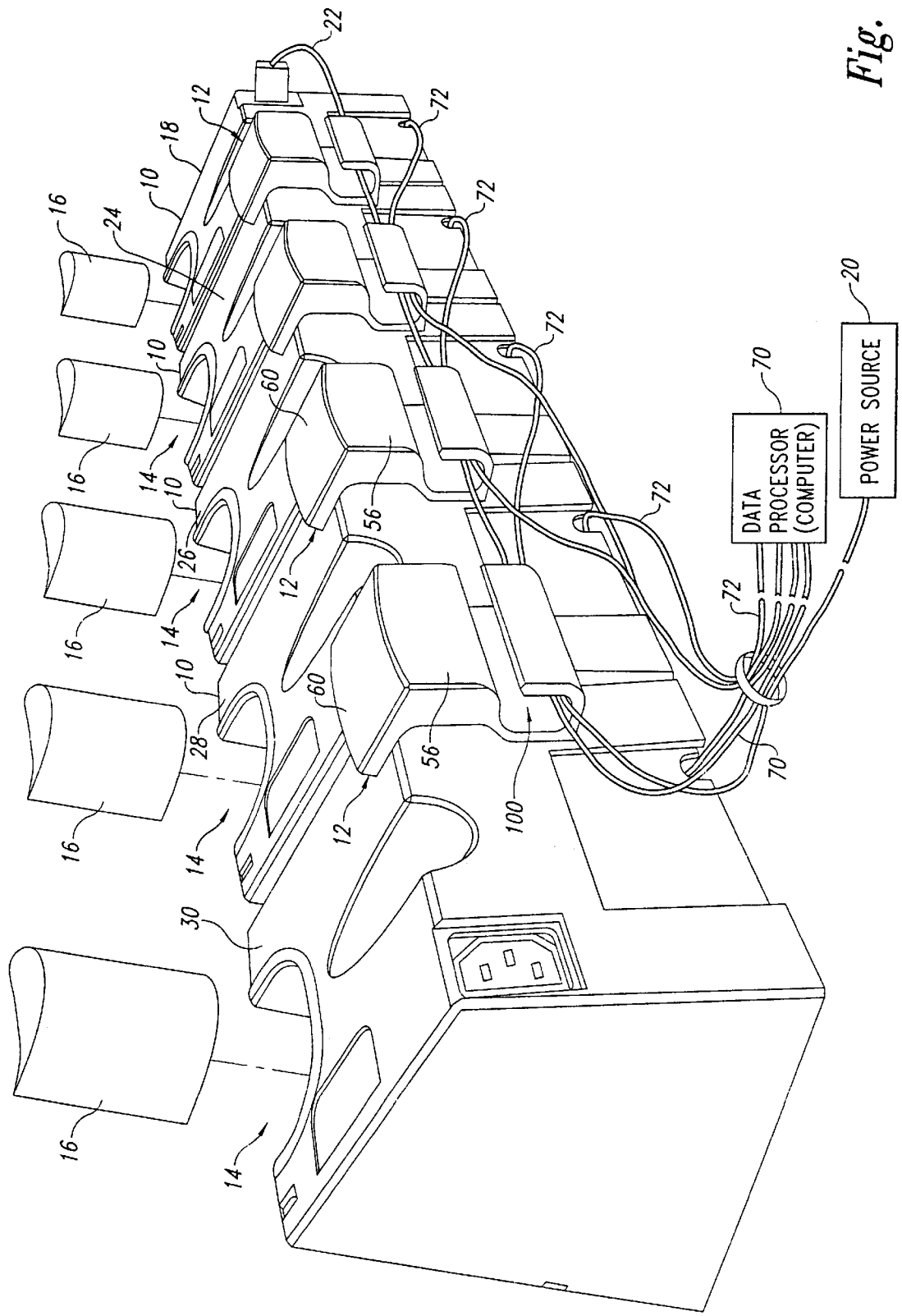
FIG. 1 is a rear isometric view showing a plurality of terminal docks with connection members or jumper connectors ganging them together in accordance with an embodiment of the present invention.
Figure 2:
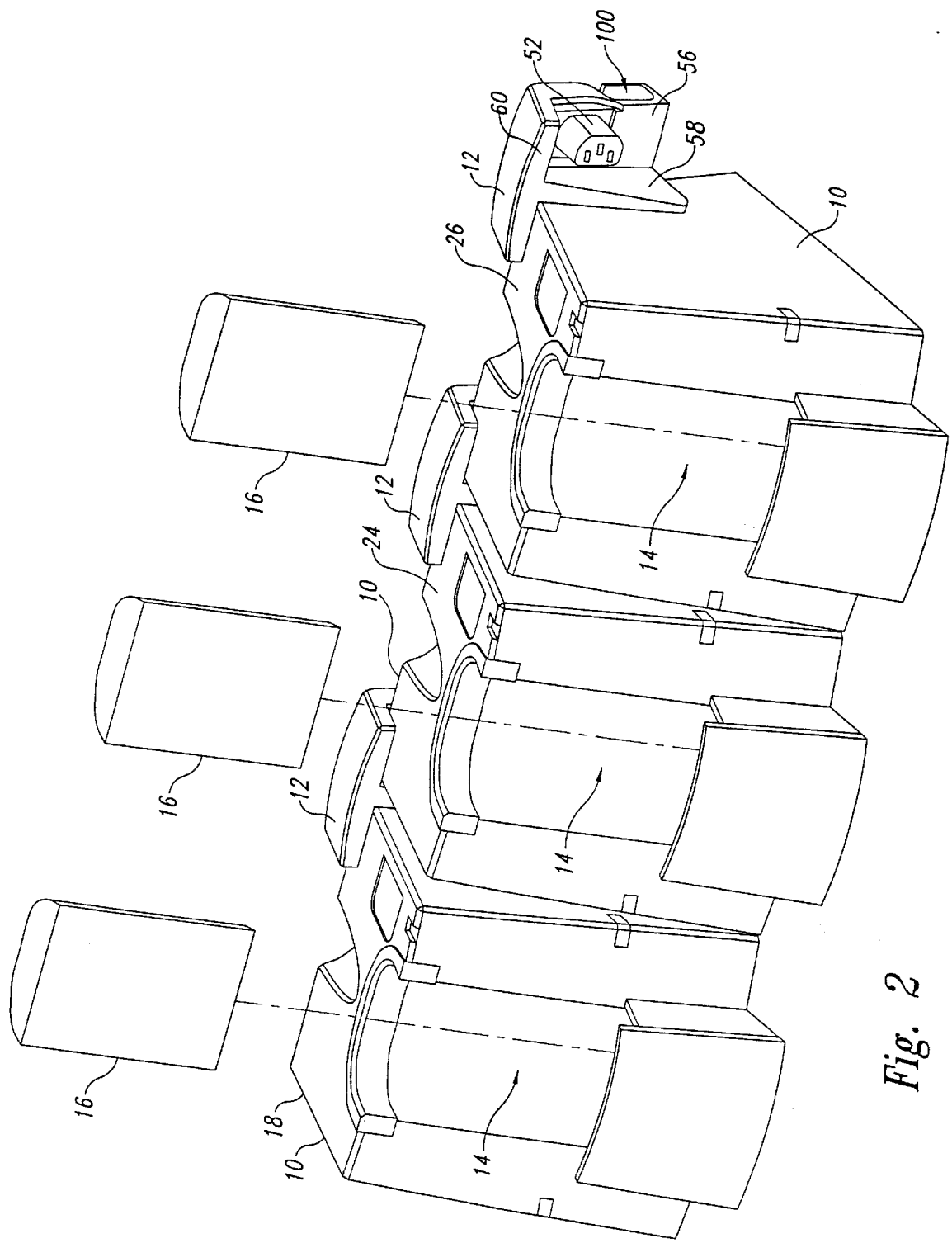
FIG. 2 is a front isometric view of the terminal docks and connectors of FIG. 1.

As best seen in FIGS. 1 and 2, a plurality of terminal docks 10 are mechanically and electromagnetically connected together in a ganged or side-by-side arrangement by a plurality of jumper connectors 12. Each jumper connector 12 releasably attaches to two terminal docks 10, so as to releasably retain the terminal docks adjacent to each other. Each terminal dock 10 has a receiving area 14 shaped and sized to removably retain a battery-powered, hand-held electronic device 16 adapted to receive and transmit data in a conventional manner. When a hand-held electronic device 16 is installed in the terminal dock's receiving area 14, the terminal dock 10 provides electromagnetic signals, such as electricity, to the electronic device for recharging its batteries, and data is transferred between the terminal dock and the electronic device.

As shown in FIG. 1, an end terminal dock 18 is connected to a power source 20 by a power cord 22. The end terminal dock 18 is releasably connected to a second adjacent terminal dock 24 by a jumper connector 12. Power from the end terminal dock 18 is provided to the second terminal dock 24 through the jumper connector 12. Third, fourth, and fifth terminal docks 26, 28, and 30 are serially connected together and to the second terminal dock 24 and the end terminal dock 18 by jumper connectors 12, so each terminal dock (except the end terminal dock) receives power from the adjacent terminal dock. Thus, power is provided serially to each terminal dock 10 coupled to the end terminal dock 18 via the jumper connectors 12 and the adjacent terminal docks. With this configuration, a separate power cord for connecting each terminal dock 10 to the power source 20 is not needed, thereby minimizing the number of cords attached to the ganged terminal docks.

Figure 3:
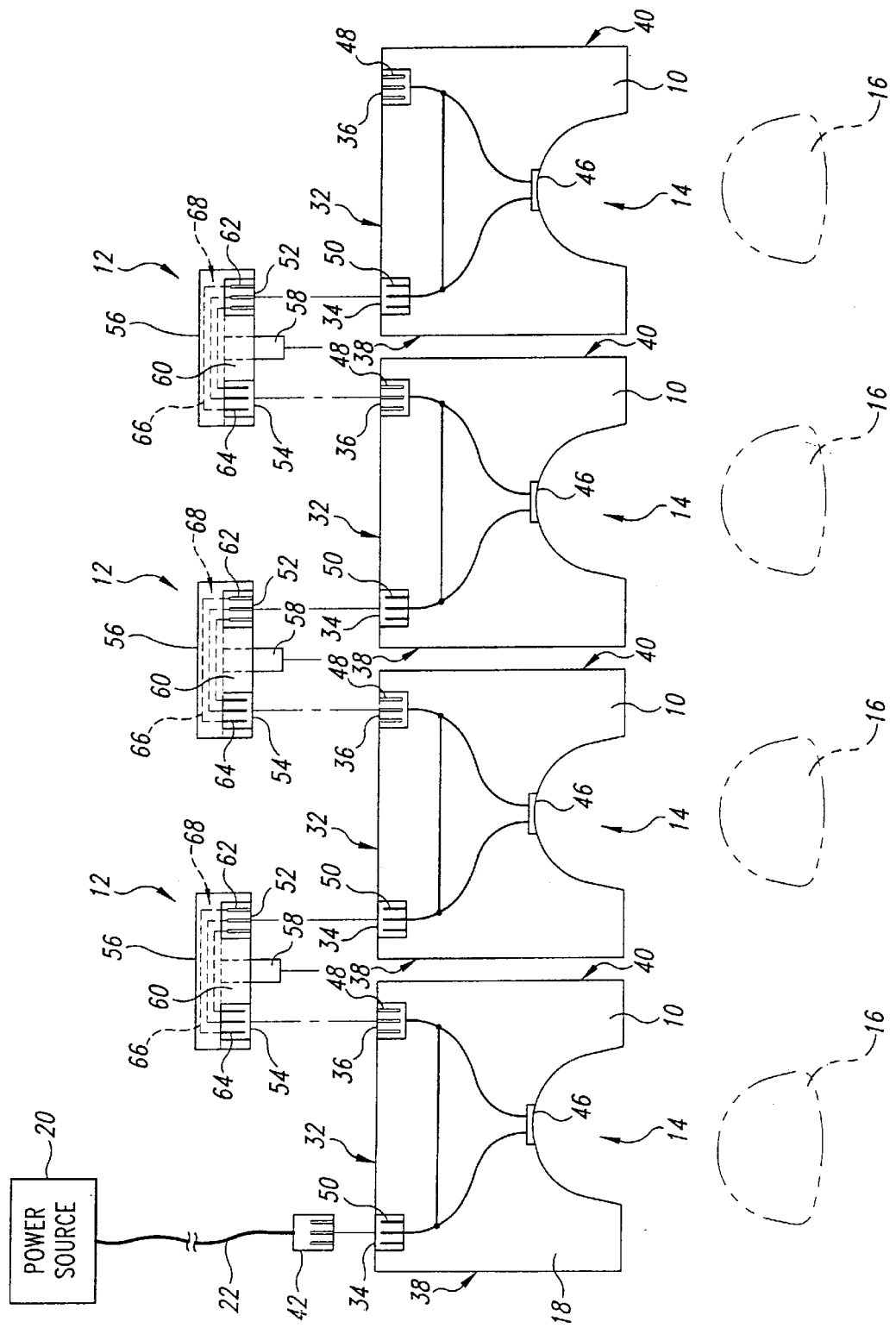
FIG. 3 is a partially exploded top plan view of the terminal docks and jumper connectors of FIG. 1 with the jumper connectors shown removed from the receptacles in the terminal docks.

FIG. 3 is a partially exploded top plan view showing a plurality of side-by-side terminal docks 10 and jumper connectors 12 that attach to the rear sides 32 of the terminal docks. The rear side 32 of each terminal dock 10 has left and right receptacles 34 and 36 generally adjacent to the terminal dock's left and right sides 38 and 40, respectively. The left and right receptacles 34 and 36 are shaped and sized to removably receive a respective jumper connector 12 therein when two terminal docks 10 are ganged together. The end terminal dock's left receptacle 34 removably receives a plug 42 on the power cord 22, thereby electrically coupling the end terminal dock 18 to the power source 20. In the illustrated embodiment, the left receptacle 34 on each terminal dock 10 has the same configuration, so any one of the terminal docks could be used as the end terminal dock 18 that receives the power cords' plug 42.

In an alternate embodiment, the end terminal dock's left receptacle 34 has a unique shape corresponding to a shape of the power cord's plug 42. Thus, the end terminal dock 18 is not interchangeable with the other terminal docks 10. In another alternate embodiment, the end terminal dock 18 has a separate power port that receives the power cord 22 and is electrically coupled to the left and right receptacles 34 and 36. The power cord 22 is inserted into the power port, thereby providing power to the terminal dock 10 and to the left and right receptacles 34 and 36.

Each terminal dock 10 also has electrical contacts 46 electrically coupled to the left and right receptacles 34 and 36. The electrical contacts 46 are positioned within the terminal docks receiving area 14 to removably and electrically engage the hand-held electronic device 16, shown in phantom lines, when the hand-held device is docked in the receiving area. Accordingly, power is provided to the docked hand-held device 16 from the receptacles 34 and 36 through the electrical contacts 46, thereby allowing, inter alia, the hand-held device's batteries to re-charge.

As best seen in FIG. 3, the left receptacles 34 in each terminal dock 10 contains an electrical male connector 50 and the right receptacle 36 contains a female connector 48. In one embodiment, the male connector 50 is a standard C14 connector and the female connector 48 is a standard C13 connector. Each connector 48 and 50 is connected to the electrical contacts 46 by conventional wiring. Although the C13 and C14 connectors are used in the exemplary embodiment, other connectors can be used in the receptacles 34 and 36 to allow power to be provided to the terminal dock 10 and to the hand-held electrical device 16 when docked.

Each jumper connector 12 has a pair of spaced apart plugs 52 and 54 electrically connected to each other. One plug 52 is shaped and sized to mate with the left receptacle 34 of one terminal dock 10, and the other plug 54 is shaped and sized to mate with the right receptacle 36 of an adjacent terminal dock. Thus, the jumper connector 12 mechanically and electrically connects adjacent terminal docks 10 together in the side-by-side configuration.

Figure 4:
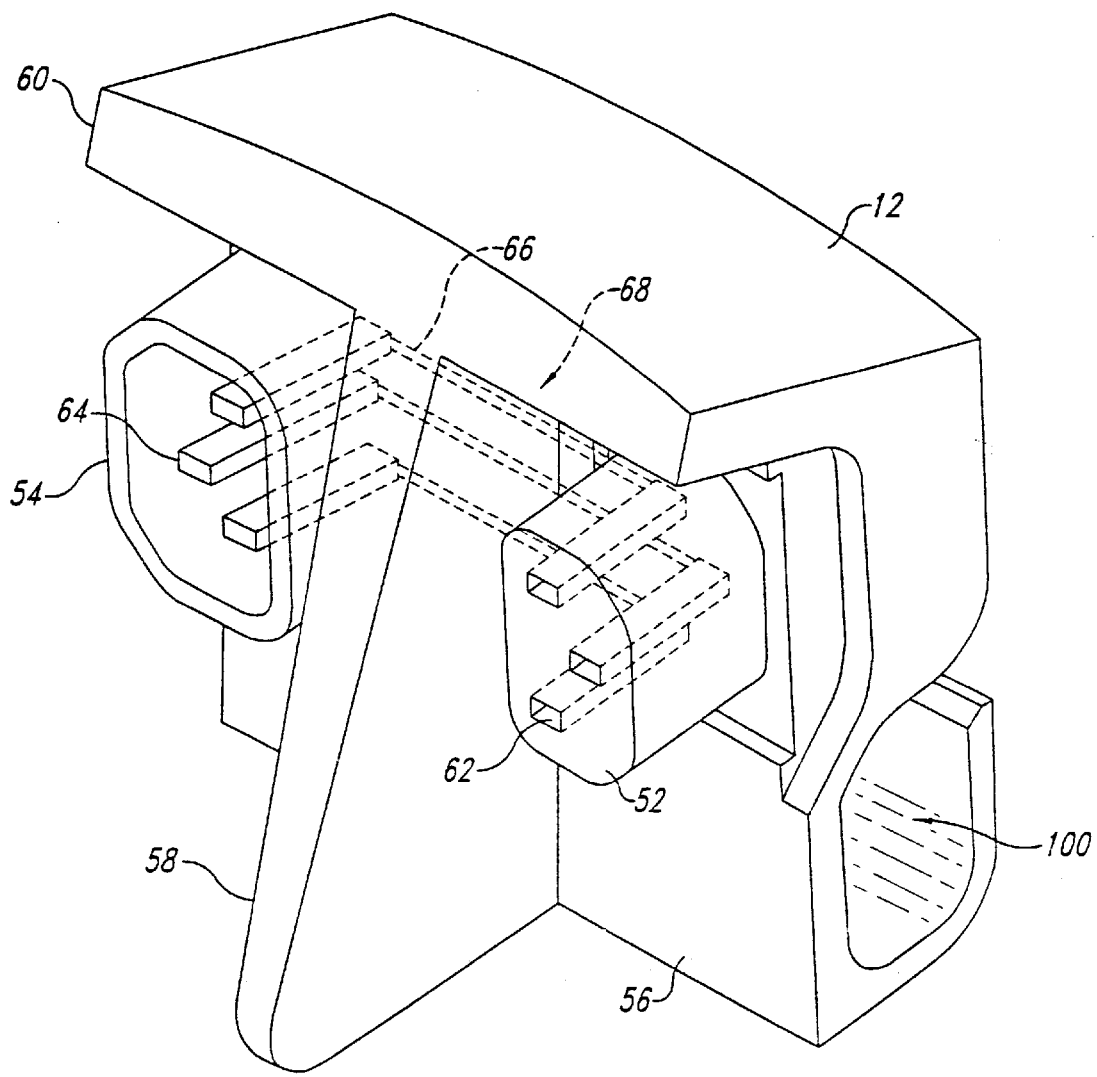
FIG. 4 is an enlarged front isometric view of the jumper connector of FIG. 1, the connector being shown removed from the terminal docks.

In the embodiment illustrated in FIGS. 3 and 4, the jumper connector 12 is a molded member with a back wall 56, and the plugs 52 and 54 project outwardly from the back wall. The plugs 52 and 54 are separated by an alignment wall 58 projecting from the back wall 56. The alignment wall 58 is sized and positioned to extend into the space between two adjacent terminal docks 10 (FIG. 3). The alignment wall 58 helps to laterally align the one plug 52 with the left receptacle 34 in one terminal dock 10 and to laterally align the other connector plug 54 with the right receptacle 36 in the adjacent terminal dock when the jumper connector 12 is moved into the installed position. The alignment wall 58 also blocks the jumper connector 12 from being moved laterally relative to the terminal docks 10 when installed, thereby protecting the plugs 52 and 54 and the respective receiving receptacles 34 and 36 against damage if, for example, the jumper connector or a terminal dock is knocked sideways during use.

The jumper connector 12 also has a top wall 60 projecting from the top of the back wall 56 and spaced above the plugs 52 and 54. The top wall 60 extends over the top sides of the adjacent terminal docks 10 (FIG. 3) when the jumper connector 12 is installed. The top wall 60 helps to vertically align the connector plugs 52 and 54 with the respective left and right receptacles 34 and 36 when the jumper connector 12 is moved into the installed position. The top wall 60 also blocks the jumper connector 12 from moving downwardly relative to the terminal docks 10 when installed, thereby protecting the connector plugs 52 and 54 and the respective receptacles 34 and 36 against damage if, for example, the jumper connector 12 or a terminal dock 10 is jarred during use.

In the illustrated embodiment, the one plug 52 contains three electrical receptors 62. The other connector plug 54 contains three prongs 64 electrically coupled to the electrical receptors 62 by wires 66 or other selected signal-transmitting members 56. The electrical receptors 62, the prongs 64, and the wires 66 interconnecting them form a power bridge 68 adapted to transmit power through the jumper connector 12 between two adjacent terminal docks 10. In one embodiment, the connector plugs 52 and 54, the back wall 56, the alignment wall 58, and the top wall 60 are molded plastic members integrally connected together to form a single connector unit. In this embodiment, the electrical receptors 62 and the prongs 64 are C14 and C13 connectors.

When the jumper connector 12 is in the installed position, the connector plug 52 snugly fits within the left receptacle 34 of one terminal block 10 (FIG. 3), and the plug's electrical receptors 62 receive and electrically connect to the male connector 50 in the left receptacle. The other connector plug 54 snugly fits within the right receptacle 36 in the adjacent terminal dock 10, and the plug's prongs 64 fit into and electrically connect to the female connector 52 in the right receptacle. Accordingly, power from one terminal dock 10 is carried to the adjacent terminal dock through the jumper connector 12, thereby providing power to the terminal dock's electrical contacts 46 and to the docked hand-held electrical device 16.

In the embodiment illustrated in FIG. 1, each terminal dock 10 is coupled to a data transmission line 72 that connects to a data processor, such as a computer 70, to provide data to and from the hand-held electronic devices 16 when docked. The data transmission line 72 connects to the back of the terminal dock 10 and extends adjacent to the backsides of the terminal docks 10 when ganged together. In the illustrated embodiment, the data transmission cables 72 are RS232 cables, although coaxial cable, fiber optics or fiber-optic cables, or other suitable data transmission cables can be used to connect the terminal docks 10 to the computer 70. The power cord 22 also extends from the end terminal dock 18 adjacent to the backsides of the ganged terminal docks 10.

Figure 5:
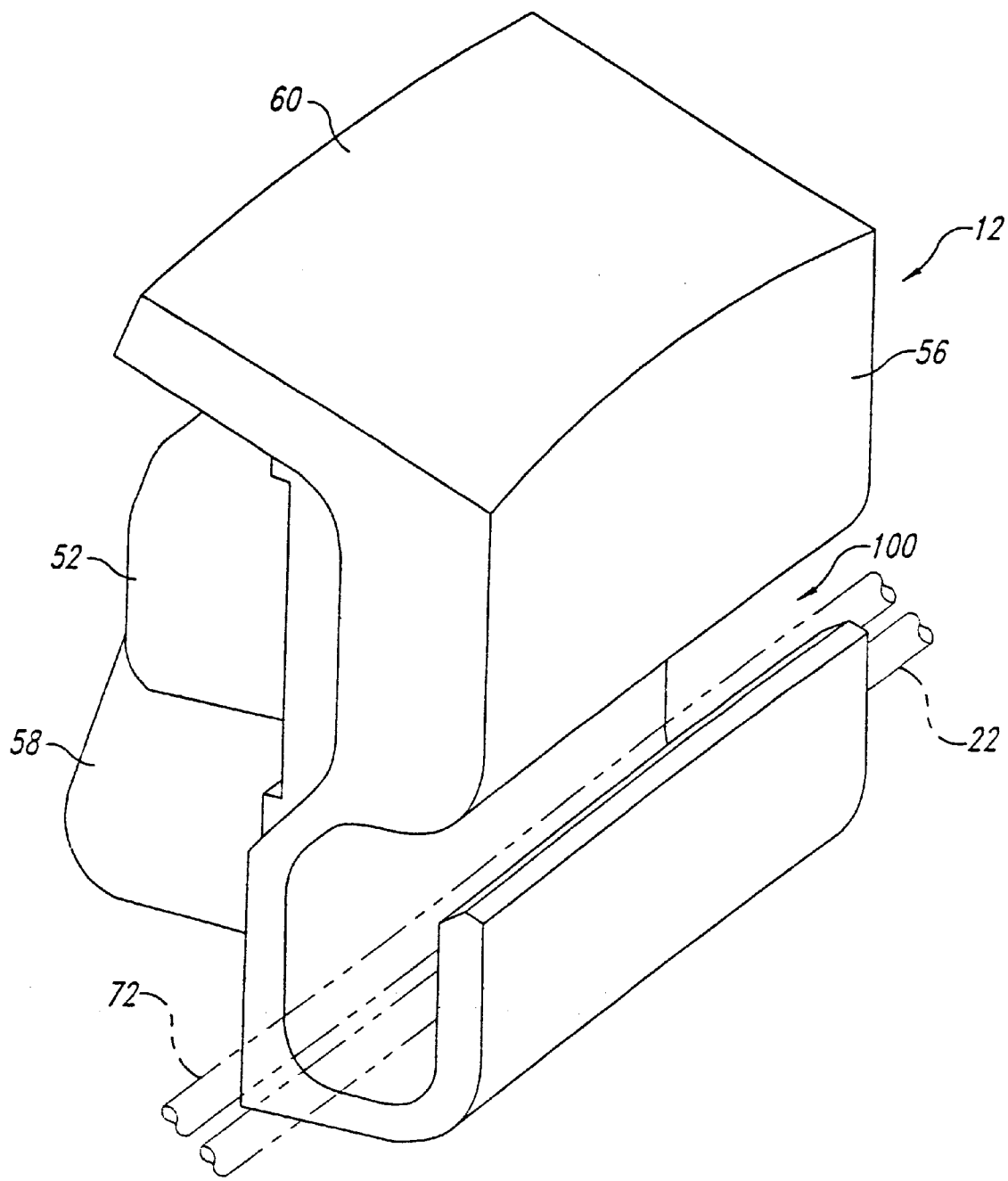
FIG. 5 is a rear isometric view of the connector of FIG. 4.

As best seen in FIGS. 1 and 5, the jumper connector 12 includes an elongated cable retention slot 100 integrally formed in the jumper connector's back wall 56. The slot 100 is shaped and sized to removably retain one or more of the data transmission lines 72 and the power cord 22 extending behind the ganged terminal docks 10, thereby providing for easy and orderly cable management behind the ganged terminal docks.

Figure 6:
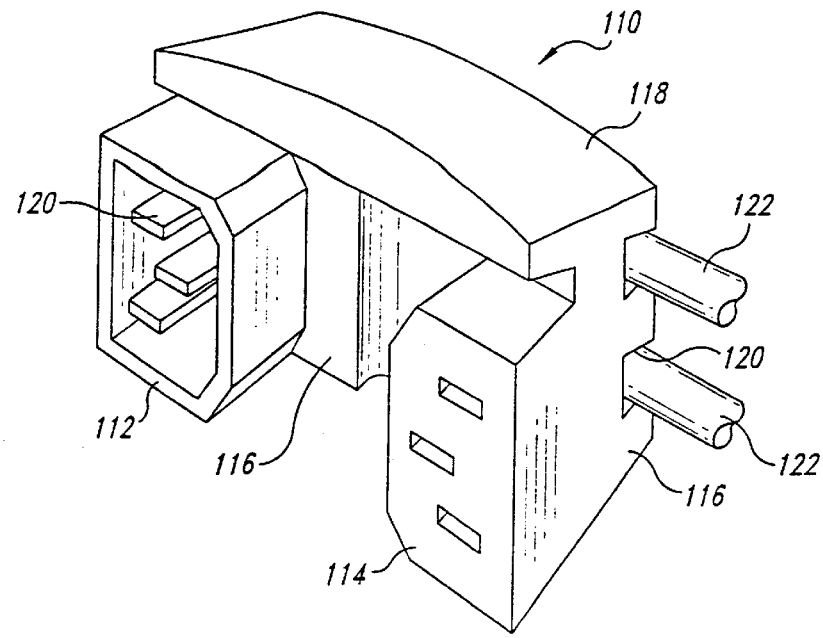
FIG. 6 is a front isometric view of a jumper connector in accordance with an alternate embodiment of the present invention.
Figure 7:
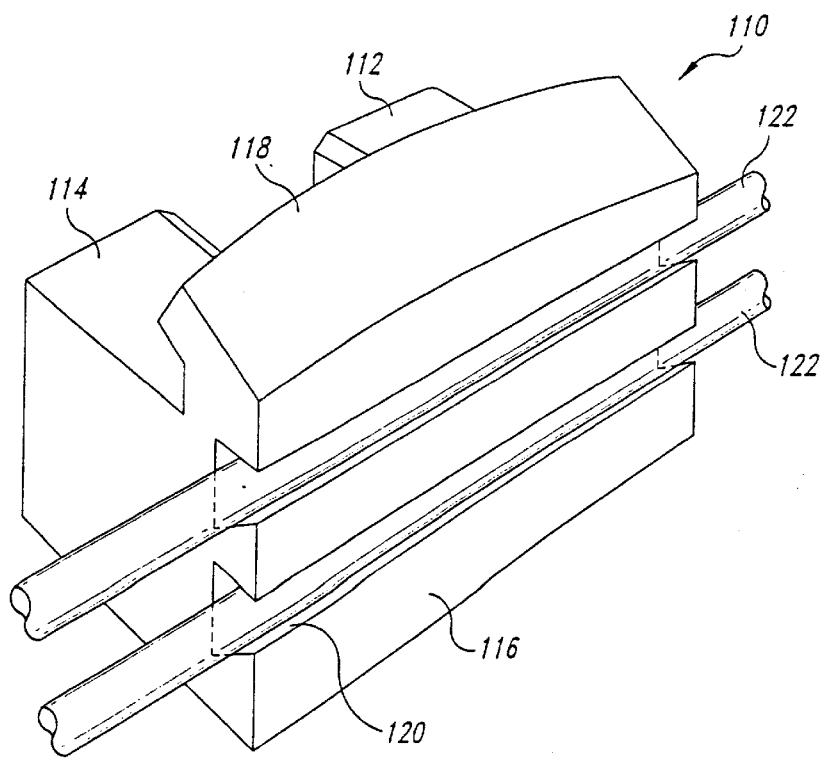
FIG. 7 is a rear isometric view of the connector of FIG. 6.

In an alternate embodiment shown in FIGS. 6 and 7, a jumper connector 110 has a pair of spaced apart connector plugs 112 and 114 projecting from a back wall 116 and positioned below a top wall 118. This jumper connector 110 does not have the alignment wall between the connector plugs 112 and 114. The connector plug 112 contains male prongs 120 (FIG. 6) and the other connector plug 114 contains female receptors 122 (FIG. 6) electrically connected to the prongs. The connector plugs 112 and 114 are shaped and sized to plug into respective left and right receptacles of a pair of adjacent terminal docks in the manner discussed above, so the prongs 120 and receptors 122 electrically connect to the terminal docks 10, thereby electrically coupling the adjacent terminal docks together.

The jumper connector 110 also has a pair of spaced apart cable retaining slots 120 formed in the back wall 116. The cable retaining slots 120 are positioned and sized to removably retain data transmission lines 122 or the like on the back of the jumper connector 110. The cable retaining slots 120 each have a diverging cross-sectional shape, such that the opening of the slot along the clip's back wall 116 is narrower than the slot's closed end wall. Thus, the data transmission lines 122, power cords, or other cables are pressed into the cable retaining slot 120 and retained in place until pulled from the slot. Although two embodiments of the cable retaining slots are shown and discussed herein, other cable retaining configurations can be used to removably retain cords or lines so as to provide the cable management function while remaining within the scope of the invention.

Figure 8:
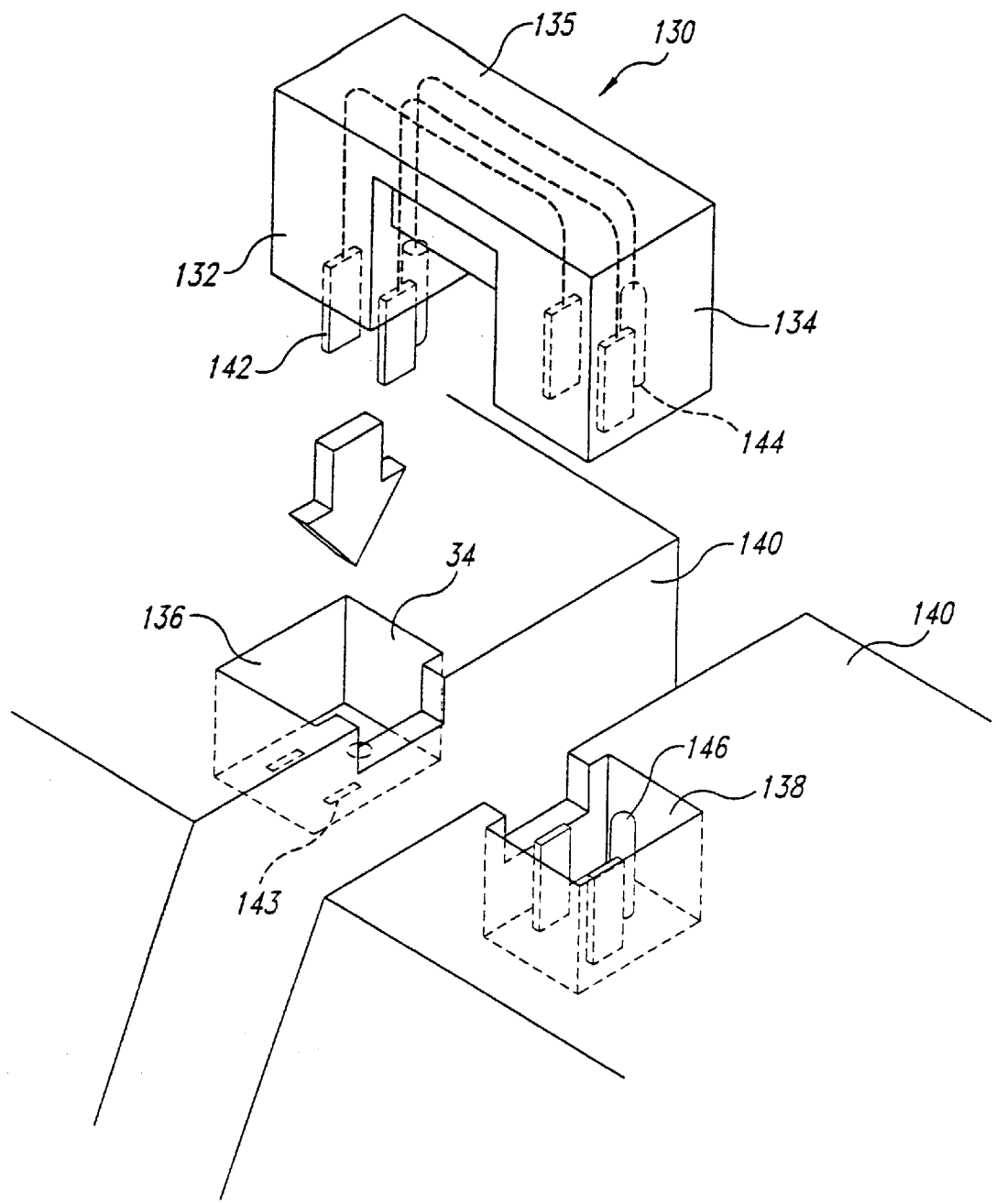
FIG. 8 is a partially exploded top isometric view of an alternate embodiment, with a jumper connector shown removed from receptacles on the top of adjacent terminal docks.

FIG. 8 is a front isometric view of a jumper connector 130 of another alternate embodiment. The jumper connector 130 is generally U-shaped and has spaced apart connector plugs 132 and 134 connected together by a web portion 135. The connector plug 132 snugly fits into the right receptacles 136 in the top side of one terminal dock 140 and the other plug 134 snugly fits into the left receptacle 138 in the top side of an adjacent terminal dock. The one plug 132 has male prongs 142 projecting therefrom that removably fit into a female connector 143 in the one terminal dock's right receptacle 136. The other connector plug 134 has female receptors 144 electrically coupled to the clip's male prongs 142 that removably receive male pin connectors 146 in the adjacent terminal dock's left receptacle 138, thereby electrically coupling the two terminal docks 140 together, while also mechanically securing the terminal docks to each other.

Figure 9:
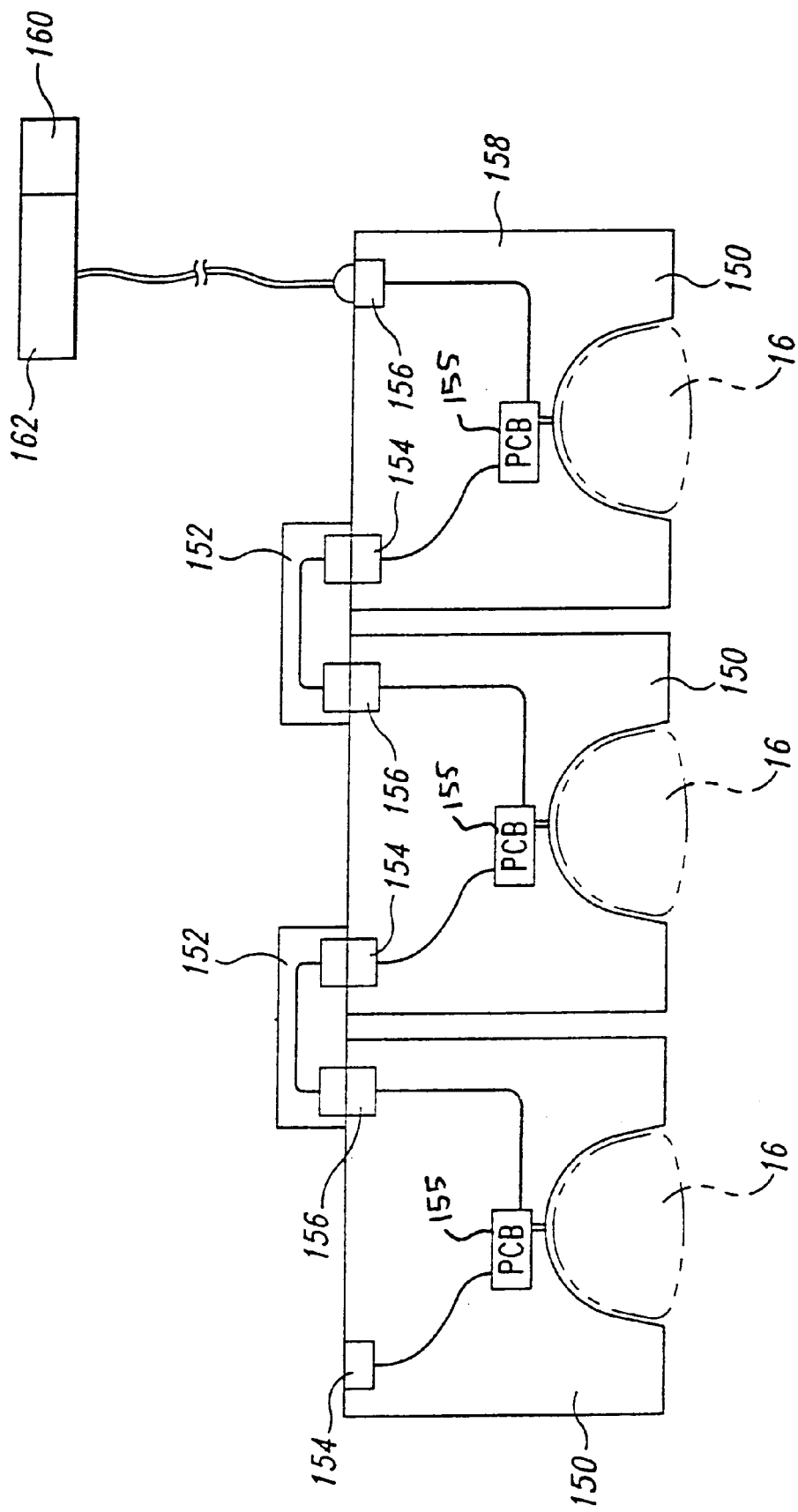
FIG. 9 is a top plan view of an alternate embodiment of the invention, wherein each terminal dock has a printed circuit board to which multi-function jumper connectors are coupleable for serial data transfer.

FIG. 9 is a schematic front plan view of three terminal docks 150 ganged together by two multi-function jumper connectors 152 in accordance with another alternate embodiment of the invention. Each multi-function jumper connector 152 joins two adjacent terminal docks 150 by plugging into respective left and right receptacles 154 and 156 in the two terminal docks. The left and right receptacles 154 and 156 in each terminal dock 150 are connected to a printed circuit board 155 in the terminal dock. The printed circuit board 155 is connected to the electrical contacts 157 in the receiving area for engaging the hand-held devices 16. The printed circuit board 155 is used for power and battery charging control and data routing. Each jumper connector 152 and the terminal docks 150 also have standard RS-422 and RS-485 connectors that mate with each other when the jumper connector is in the installed position, thereby providing a multi-point communications bus between the terminal docks. Accordingly, the jumper connector 152 electrically couples the two terminal docks 150 together so as to provide electromagnetic signals (e.g., power and data) between the terminal docks, through the jumper connector.

The end terminal dock 158 on the right side of FIG. 8 is connected to a power source 160 and a computer 162 or other data processing unit. In the illustrated embodiment, the power is provided from the power source 160 to the terminal dock 158, through the computer 162, through a standard communications line, and a RS-422/RS-485 interconnection in the end terminal dock's right receptacle 156. Accordingly, power and data transmission is provided between the ganged terminal docks 150 through the jumper connectors 152, thereby eliminating multiple power cords or data transmission lines extending behind the terminal docks.

Figure 10:
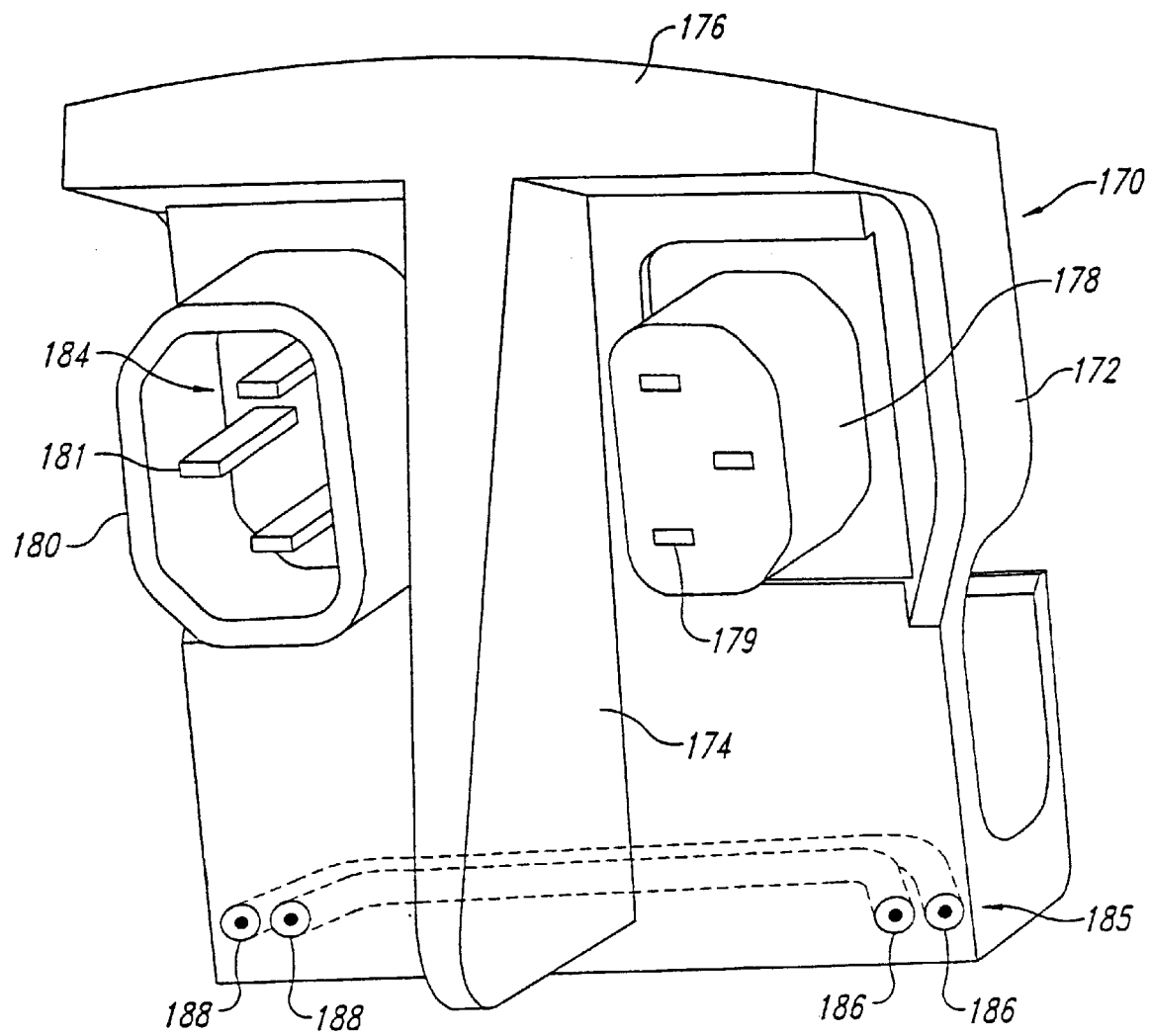
FIG. 10 is an enlarged front isometric view of a multi-function jumper connector in accordance with an alternate embodiment.

FIG. 10 is a front isometric view of a multi-function jumper connector 170 in accordance with another alternate embodiment of the invention. The jumper connector 170 has the same shape as the jumper connector of FIGS. 4 and 5, discussed above, with a back wall 172, an alignment wall 174, a top wall 176, a plug 178 containing female receptors 179, and a plug 180 containing male prongs 181. The female receptors 179 and the male prongs 181 are connected together by wires to form a power bridge 184 extending through the back wall 172 and the plugs 178 and 180. The power bridge 184 allows electromagnetic signals to be passed through the jumper connector 170 between the plugs 178 and 180.

The jumper connector 170 of this alternate embodiment also has a pair of optical fibers 185 extending through the back wall 172. Each optical fiber 185 has an open end 186 positioned below one connector plug 178, and another open end 188 positioned below the other connector plug 188. The optical fibers 185 allow data signals to pass through the jumper connector 170 between the open ends 186 and 188. In the illustrated embodiment, the optical fibers 185 are suitable for carrying Infrared Data Association (IrDA) data signals therethrough.

Figure 11:
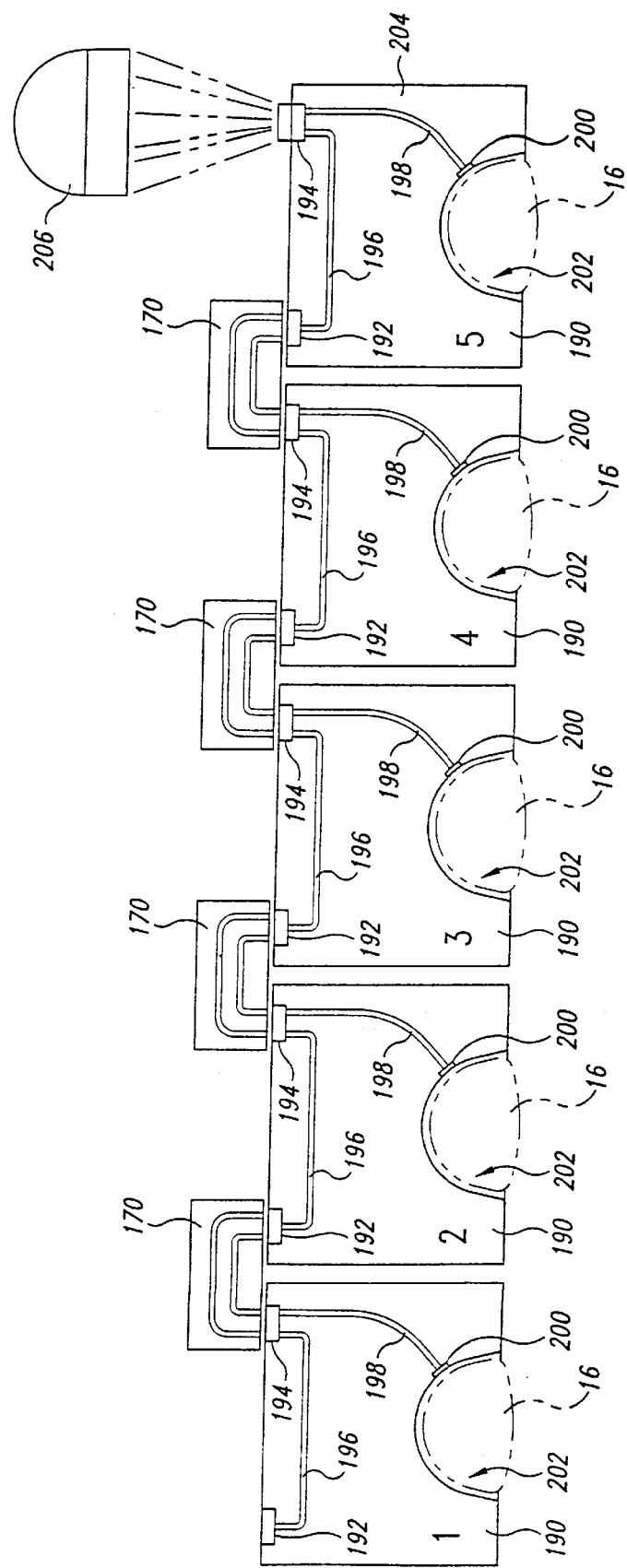
FIG. 11 is a top plan view of terminal docks with data transmission lines therein, and the multi-function jumper connector of FIG. 10 coupled to the data transmission lines in accordance with an alternate embodiment.

FIG. 11 is a top plan view of five terminal docks 190 ganged together by four jumper connectors 170. The jumper connectors 170 optically connect the terminal docks 190 together. The jumper connectors 170 also mechanically and electrically connect the terminal docks 190 together as discussed above. The electrical connectors and wiring in the jumper connectors 170 are not shown in FIG. 11 for purposes of clarity and to avoid obscuring the optical fibers 185 in the jumper connectors and the terminal docks 190.

The rear side of each terminal dock 190 includes a left optic coupler 192 and a right optic coupler 194. When two terminal docks 190 are positioned side-by-side, and the left optic coupler 192 of one terminal dock is generally adjacent to the right optic coupler 194 of the other terminal dock. When the jumper connector is in the installed position, the generally adjacent left and right optic couplers 192 and 194 are positioned to align with the open ends 186 and 188 of the optic fibers 185 in the jumper connector 170. The jumper connector 170 thus allows the optical data to pass therethrough and between the ganged terminal docks 190.

In each terminal dock 190, the right and left optic couplers 194 and 192 are connected to each other by an optical fiber 196. The right optic coupler 194 is also connected by an optical fiber 198 to a coupler 200 in the terminal dock's receiving area 202. When a hand-held unit is docked in the receiving area 202, data can be optically transmitted to or from the unit through the coupler 200 and the optical fiber 198 and to the right optic coupler 194. For each terminal dock 190 other than the end terminal dock 204, the data is passed through the right optic coupler 194, through the jumper connector 170 via one or more of the optic fibers, and to the left optic coupler 192 of the adjacent terminal dock. Accordingly, the data is optically transmitted serially through the ganged terminal docks 190 and the jumper connectors 170 to or from the right optic coupler 194 of the end terminal dock 204. This configuration eliminates the need for separate cables extending from each terminal dock 190, thereby simplifying or eliminating the need for cable management behind the ganged terminal docks.

The right optic coupler 194 in the end terminal dock 204 is positionable adjacent to a transceiver 206 adapted for optical data transfer to or from the end terminal dock. In the illustrated embodiment, the transceiver 206 is adapted for IrDA data transfer to and from the hand-held units. Other optical data transfer protocols or formats can also be used.

Although specific embodiments of, and examples for, the invention are described herein for illustrative purposes, various equivalent modifications can be made without departing from the spirit and scope of the invention, as will be recognized by those skilled in the relevant art. The teachings provided herein of the invention can be applied to docking stations for other electronic devices, not necessarily the hand-held electronic devices generally described above. Various power, electricity, or data-carrying mechanisms can also be used with the jumper connectors while remaining within the spirit and scope of the invention.

These, and other changes can be made to the invention in light of the above detailed description. In general, in the following claims, the terms used should not be construed to limit the invention to the specific embodiments disclosed in the specification and the claims, but should be construed to include all terminal docks and jumper connectors that operate in accordance with the claims. Accordingly, the invention is not limited by the disclosure, but instead its scope is to be determined entirely by the following claims.

We claim:

1. An assembly of terminal docks, comprising:
   a first terminal dock connectable to a source that provides power and data to the first terminal dock;
   a second terminal dock;
   a first connection member spanning between the first and second terminal docks and mechanically retaining the first and second terminal docks adjacent to each other, the first connection member having a first pathway that carries the power and data between first or second terminal docks;
   a third terminal dock; and
   a second connection member separate from the first connection member and spanning between the second and third terminal docks, the second connection member mechanically retaining the third terminal dock adjacent to the second terminal dock, the second connect member having a second pathway that carries at least a portion of the power and data the second terminal dock received from the first terminal dock to the third terminal dock.

2. The assembly of claim 1 wherein the first connection member has a slot therein sized to releasably retain a selected cable therein.

3. The assembly of claim 1 wherein the first connection member carries the data between the first and second terminal docks.

4. An assembly of terminal docks connectable to a power source and a data source, comprising:
   a first terminal dock connectable to the power source and the data source;
   a second terminal dock adjacent to the first terminal dock;
   a connection member releasably retaining the first and second terminal docks adjacent to each other, the connector being in electromagnetic engagement with the first and second terminal docks and being configured to transfer power and data signals therebetween, the connection member having a receptacle therein sized to releasably retain a selected line therein adjacent to the first and second terminal docks.

5. The assembly of claim 4 wherein the connection member has a first plug member connected to first terminal dock, and a second plug member connected to the second terminal dock.

6. The assembly of claim 4 wherein the connection member has a body portion and the receptacle is defined by an elongated slot formed in the body portion.

7. A ganging connector connectable to first and second terminal docks to hold the terminal docks adjacent to each other and to provide power and data between the first and second terminal docks, comprising:

a first engagement member releasably connectable to the first terminal dock;

a second engagement member connected to the first engagement member and connectable to the second terminal dock, the second engagement member being positioned to mechanically retain the second terminal dock immediately adjacent to the first terminal dock; and an electromagnetic pathway through and between the first and second engagement members, the electromagnetic pathway being configured to receive the power and data from one of the first and second terminal docks and provide the power and data to the other of the first or second terminal docks.

8. The ganging connector of claim 7 wherein the first and second engagement members are integrally connected to a body portion.

9. The ganging connector of claim 7 wherein the electromagnetic pathway is an electrical pathway embedded in the first and second engagement members.

10. The ganging connector of claim 7 wherein the electromagnetic pathway includes pin connectors in the first engagement member and pin-receiving members in the second engagement member.

11. The ganging connector of claim 7, further comprising a body portion with an elongated receptacle formed therein, the receptacle being sized to removably retain a selected power or data transmission line therein.

12. The ganging connector of claim 7, further comprising a body portion connected to the first or second engagement members, and an alignment member connected to the body portion and positioned to align the first and second engagement members with the respective terminal docks when the ganging member is being connected to the terminal docks.

* * * * *

UNITED STATES PATENT AND TRADEMARK OFFICE
CERTIFICATE OF CORRECTION

PATENT NO : 6,137,260
DATED : October 24, 2000
INVENTOR(S): Wung et al.

It is certified that error appears in the above-identified patent and that said Letters Patent are hereby corrected as shown below:

On the cover, left column, the date of filing should be
--Jan. 29, 1999--.

Signed and Sealed this

Eighth Day of May, 2001

Attest:

NICHOLAS P. GODICI

*Attesting Officer*  *Acting Director of the United States Patent and Trademark Office*